J. D. COUGHLIN.
BELTING.
APPLICATION FILED OCT. 15, 1918.
1,341,973.
Patented June 1, 1920.
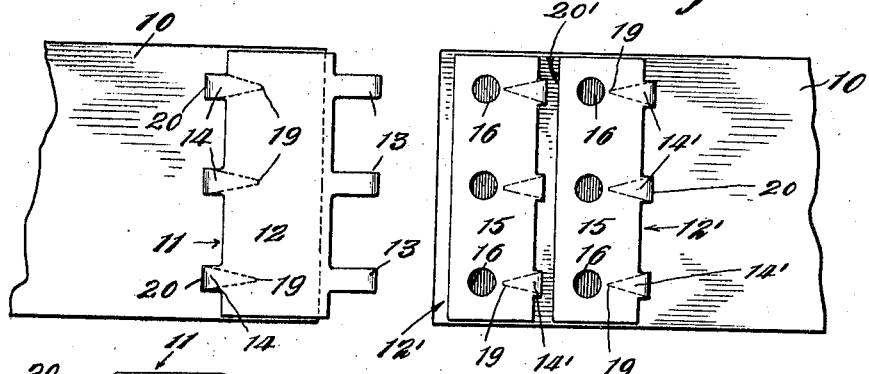
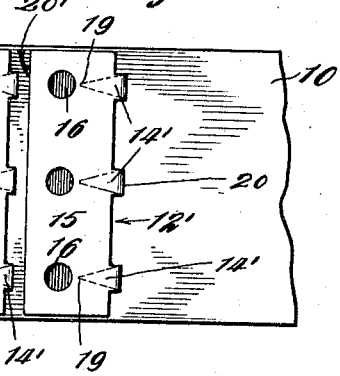
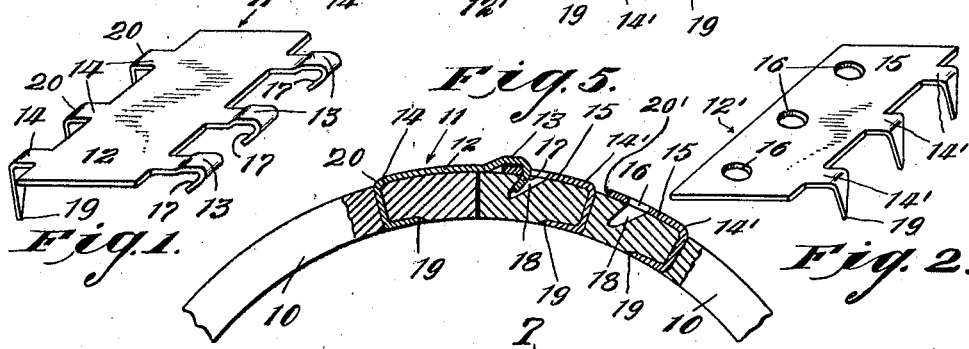
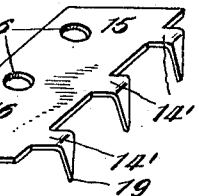
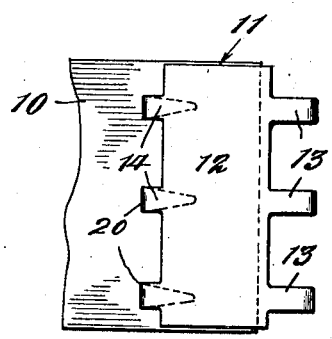
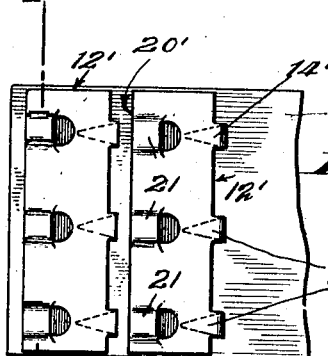
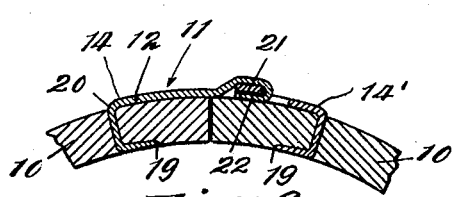
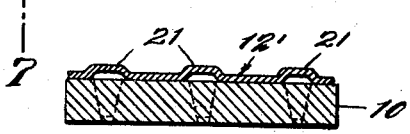
INVENTOR
BY Joseph D Coughlin
ATTORNEY

UNITED STATES PATENT OFFICE.

JOSEPH D. COUGHLIN, OF NEW YORK, N. Y., ASSIGNOR TO WEIN SALES CORPORATION, OF NEW YORK, N. Y., A CORPORATION OF NEW YORK.

BELTING.

1,341,973.  Specification of Letters Patent.  Patented June 1, 1920.

Application filed October 15, 1918. Serial No. 258,268.

*To all whom it may concern:*

Be it known that I, JOSEPH D. COUGHLIN, a citizen of the United States, and resident of New York city, in the county of New York and State of New York, have invented certain new and useful Improvements in Belting, of which the following is a specification.

This invention relates to belting and is directed particularly to providing advantageous means for fastening the two ends of the belt and taking up any slack therein.

One object of the present invention is to provide fastening means of the character described which shall leave the gripping surface of the belt smooth and free from any projections or obstructions so as not to interfere with the running of the belt.

Another object is to provide fastening means of the character described which may positively hold the ends of a belt together securely.

A further object is to provide fastening means of the character described which may be made and sold as a separate article which may be readily attached to belting.

A still further object is to provide means for taking up the slack in a belt, as when the latter becomes loose after some use, easily and in a way to insure that the belt is cut off straight at an end, so that the belt shall continue to run true.

Other objects and advantages of this invention will appear from the detailed description and the features of novelty will be particularly pointed out in the claims.

In the drawing accompanying this specification and forming a material part thereof, Figure 1 is a perspective view of the male portion of the newly improved fastening means;

Fig. 2 is a perspective view of the female portion thereof;

Fig. 3 is a partial plan view of a belt shown open with the fastening means attached to the ends thereof;

Fig. 4 is a similar plan view showing a modified form of the fastening means;

Fig. 5 is a cross-sectional view through the fastening means of a belt having its ends closed thereby;

Fig. 6 is a similar cross-sectional view through the modified form of fastening means, and Fig. 7 is a section cut along line 7—7 of Fig. 4.

Referring in detail to the drawing, 10 is a belt having one end provided with the male portion 11 of the fastening means. The latter is seen to consist of a plate 12, preferably of metal formed at the forward end with projecting hooks 13, and at the rear end with the teeth 14, substantially at right angles to the surface of the plate for gripping the material of the belt. The female portion 12′ is likewise formed from one piece of metal to provide a plate 15 having the holes 16 punched therein and formed at the rear end with the projecting teeth 14′. In the form shown in Figs. 3 and 5, the hooked projections 13 are bent at an angle as shown at 17 so as to enter the angular depression 18 in the abutting end of the belt, as will be readily understood. This insures a positive interlocking between the male and female portions of the fastening means, so that the belt cannot open while running. In fact, when the belt is in motion its tension causes the hooks to be pressed more tightly against the walls of the recesses and thus affords a most secure closing of the belting about the pulley. In practice, in applying the female portions to the end of a belt a punch is used having parts adapted to enter the holes 16, and formed with an inclined end to form the angular recesses in the belt. In attaching the plates 12 and 12′ the pointed ends 19 of the teeth are bent around as at 20 to be substantially parallel to the bottom surface of the belt and are embedded in the material thereof so as to be substantially flush with the inner surface of the belt and thus have it free from projections to present a smooth surface to the pulley, as will appear from Figs. 5 and 6. I provide one end of the belt with several of the female portions spaced apart to provide a guide for the cutting tool when it is desired to cut off a piece of the belt to take up the slack. This guide is formed by the wall 20′ of the adjacent sides of the female portions, as will be readily understood, and is of great advantage in preventing the belt from being cut off at an angle—a difficulty heretofore had which prevents the belt from running true.

In the modified form shown in Figs. 4, 6, and 7, I form the plate, 12′ with raised portions 21 adjacent the holes and when the belt is closed the projecting hooks 13 pass through these holes and underneath these raised portions as at 22 in Fig. 6. In this form the ends of the hooks are bent to be substantially parallel to the plate. With this modified form of fastening means no recesses need be punched in the material of the belt as will be readily understood.

Having thus described my invention what I claim as new, and desire to secure by Letters Patent is:

1. A belt having angular recesses formed in one end thereof, a plate having perforations therein overlying said recesses and a plate on the other end provided with hooks extending from the other end, said hooks extending at an angle to enter said recesses.

2. A belt having fastening means secured to the ends thereof, said fastening means comprising a male portion secured at one end and a plurality of female portions secured to the other end, said female portions being spaced apart so as to provide a guide for a cutting tool adapted to enter between the adjacent walls thereof.

3. A belt having angular recesses formed in one end thereof, a plate having perforations therein overlying said recesses, and a plate on the other end provided with hooks extending therefrom at an angle adapted to engage in said perforations and register with said angular recesses.

4. A belt having angular recesses formed in one end thereof, a plate having perforations therein overlying said recesses, a plate on the other end provided with hooks extending therefrom at an angle adapted to engage in said perforations and register with said angular recesses, and means extending from said plates for the securing thereof to the ends of the belt having teeth portions extending substantially parallel to said plates adapted to be embedded in the inner surface of the belt so as to be substantially flush therewith.

Signed at New York city, in the county of New York and State of New York, this 14th day of October, A. D. 1918.

JOSEPH D. COUGHLIN.

Witness:
AARON H. RULIN.